July 2, 1968  T. J. PODGORSKI  3,390,606
CONTROL APPARATUS
Filed March 1, 1965  2 Sheets-Sheet 1
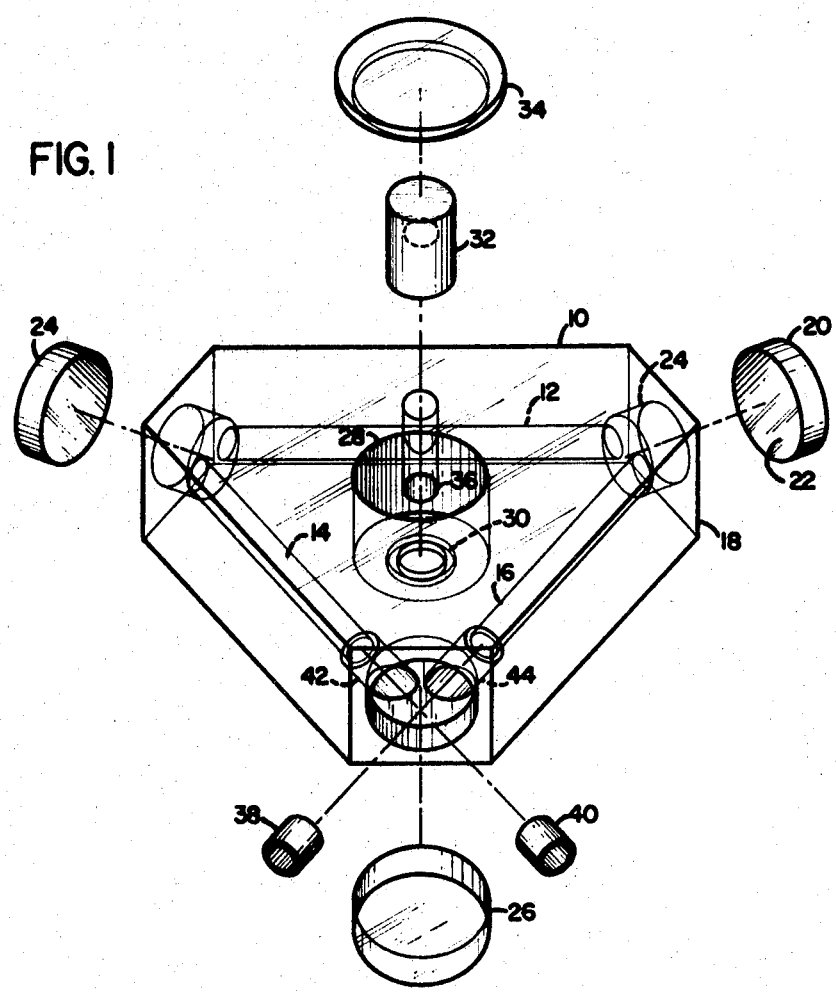
FIG. I
INVENTOR.
THEODORE J. PODGORSKI
BY Charles J. Ungemach
ATTORNEY

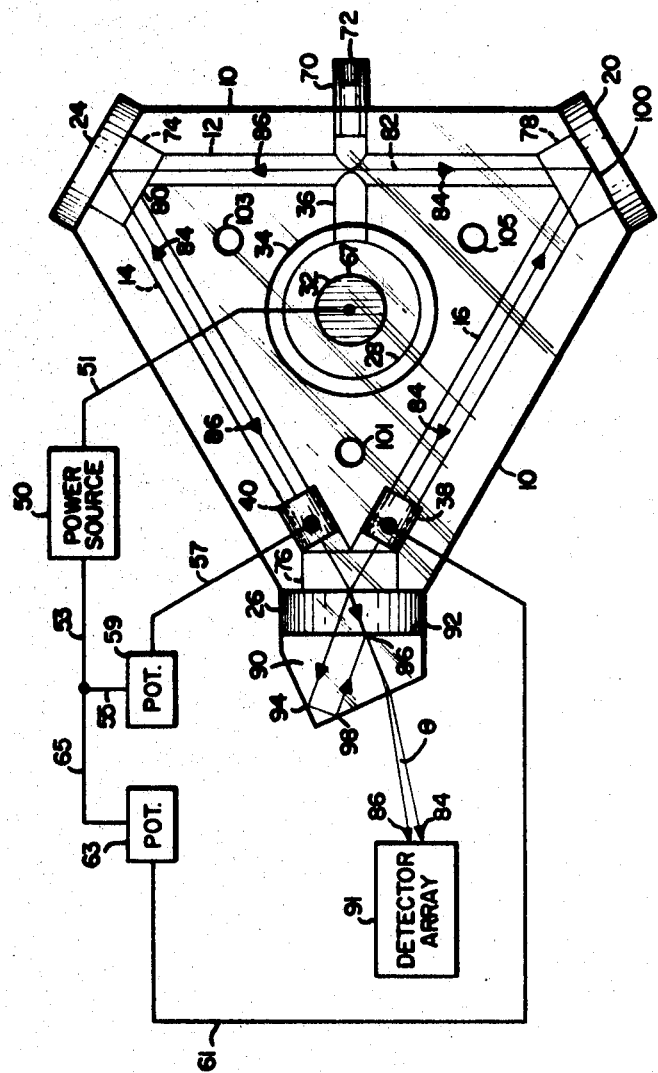

United States Patent Office 3,390,606
Patented July 2, 1968

3,390,606
CONTROL APPARATUS
Theodore J. Podgorski, St. Paul, Minn., assignor to Honeywell Inc., a corporation of Delaware
Filed Mar. 1, 1965, Ser. No. 435,969
8 Claims. (Cl. 88—14)

ABSTRACT OF THE DISCLOSURE

A laser angular rate sensor in which a quartz block has a polygonal tunnel in it containing a lasing gas, mirrors on it to direct laser beams two directions through the tunnel, and separate but connected cavities containing electrodes to supply current to generate the laser beams along with means to measure the frequency difference between the two beams.

---

The present invention relates to apparatus and methods for measuring rotation and more particularly to the class of devices which senses rotation by comparing the frequencies of two oppositely rotating beams of light. In these devices a monochromatic source of light, normally a laser, is used to produce two identical single frequency beams of light traveling in opposite directions along a closed loop path about the axis of rotation. The loops are defined by mirrors which control the path of the two counter-rotating light beams. The beams rotating in the same direction as the apparatus will be of somewhat different frequency than the beam rotating in the opposite direction. This difference in the frequency has been found to be proportional to the rate of rotation and, therefore, a device can be constructed which will measure rotation by this effect. Such a device is called a laser angular rate sensor or a "laser gyroscope."

Devices of this sort are normally subject to large errors which arise through small imperfections and misalignments in the mirror surfaces and in the spacing of the mirrors. Prior art devices of this type have usually employed a number of micrometer adjusted mirrors in a square with lasers in some or all of the legs of the square in order to construct this sort of device. This form of laser gyroscope requires elaborate adjustment of the mirrors in order to achieve operation, and is very sensitive to small vibrations or shocks. Furthermore it does not retain its alignment very long, and does not lend itself to simple production techniques.

The present invention avoids the above mentioned difficulties by providing a novel and unique form of construction for a laser gyroscope. Briefly, a solid block of quartz has three holes drilled in it at 60° angles to each other so as to form a triangular path within the block in which the two counter rotating beams of light may travel. At the three points on a surface of the block where the holes intersect dielectric mirrors are glued onto the faces of the block so as to reflect light from one hole into the next hole. A large cup shaped cavity is drilled in the center of the block and connected to the triangular path so as to provide a large reservoir for the lasing gas. This large hole also contains a cathode which supplies current to energize the lasing gas so that a laser beam may be maintained in the triangular cavity.

It is an object of my invention, therefore, to provide a new and improved laser angular rate sensor which may be ruggedly and inexpensively constructed.

Further objects and advantages will become apparent in the following description and drawings in which:

FIGURE 1 is an exploded view of some of the major components of my invention; and FIGURE 2 is a schematic showing of the top view of my invention in which the path of the laser beams is illustrated.

In FIGURE 1 a disassembled or exploded view of the apparatus of the present invention is shown with a number of the parts excluded for the purpose of clearness. FIGURE 2 shows the same apparatus with all of the parts included. In FIGURE 1 a substantially transparent quartz block 10 is shown with a group of three lasing tubes 12, 14, and 16 bored therethrough. The ends of lasing tubes 12, 14, and 16 are joined near the corners of the triangular quartz block 10 so as to form a triangular cavity within the quartz block. A quartz block is used in the preferred embodiment because quartz is relatively stable in size and shape in response to mechanical and thermal stresses. It should be understood, however, that other materials may be utilized such as ceramic or the like.

At the intersection of tube 12 and tube 16 the side 18 of block 10 is faced off at the correct angle so that a mirror 20 may be bonded to face 18 so as to reflect light from tube 12 into tube 16 and from tube 16 into tube 12. In the preferred embodiment mirror 20 has a dielectric coating 22 chosen so as to better reflect the desired frequency of light and is bonded to surface 18 by means of optical contact and a suitable epoxy glue. Similarly a mirror 24 and a mirror 26 are bonded to quartz block 10 at the intersections of tube 12 and tube 14 and at the intersection of tube 14 and tube 16. The mirrors 20, 24, and 26 are also constructed of quartz for thermal and mechanical stability although other materials may be used.

A large, cup shaped, reservoir cavity 28 is drilled in the center of block 10 and an annular groove 30 is cut in the bottom of cavity 28. Groove 30 accepts the base of a cylindrical cathode 32. A quartz cap 34 mounts onto the top of cavity 28 so as to seal cathode 32 therein. In the preferred embodiment cap 34 is made of quartz and sealed to block 10 with a suitable epoxy glue as described with reference to the mirrors.

Another small hole 36 is drilled from the side of cavity 28 through tube 12 and to the exterior of block 10. The appropriate lasing gas may be inserted through hole 36 into tubes 12, 14, and 16 and into the large cavity 28 which acts as a reservoir for the lasing gas. The greater amount of lasing gas afforded by reservoir cavity 28 assures a longer operational life than would be had if only tubes 12, 14, and 16 were filled with gas. A pair of cylindrical anodes 38 and 40 are inserted into the enlarged ends of tubes 14 and 16 indicated by numerals 42 and 44. To cause lasing action in the triangular cavity a direct current discharge between cathode 32 and anodes 38 and 40 is utilized. To better demonstrate this operation reference should be had to FIGURE 2.

FIGURE 2 presents a schematic top view of the apparatus of FIGURE 1 in which similar components are numbered the same as in FIGURE 1. In operation a power source 50 maintains a DC current between cathode 32 and anode 40 by means of a group of conductors 51, 53, 55, and 57 and a potentiometer 59. Power source 50 also maintains a DC current between cathode 32 and anode 38 by means of a conductor 61, a potentiometer 63, a conductor 65 and conductor 53 and 51. The first discharge current is emitted from the interior of hollow cathode 32 and flows through a small hole 67 in the side of cathode 32, through tube 36 and tube 12 towards mirror 24, and along tube 14 to anode 40 and is controlled in intensity by potentiometer 59. The second discharge current flows for inside cathode 32 through hole 67, tube 36, tube 12, and tube 16 to anode 38 and is controlled in intensity by potentiometer 63. Cathode 32 is hollow and retains the discharge within it so as to minimize sputtering effects which would tend to change the composition of the lasing gas, thus, deteriorating the quality of lasing required for a device of this sort. Also, causing the laser angular rate sensor to discharge in two opposite directions to two anodes operates to cancel out the effects of the Fresnel drag effect in which the movement of matter in one direction around the triangle causes the two counter-rotating beams to shift in frequency even though the sensor is not rotating. By adjusting potentiometer 59 and potentiometer 63 the two discharges may be balanced to cancel out the Fresnel drag effect.

A fill tube 70 is shown in FIGURE 2 which is blocked by suitable means, shown as a plug 72 in the preferred embodiment, after the proper amount of lasing gas has been put into the cavities in block 10.

In order to prevent the gas discharge current from injuring the dielectric coating on the mirrors 20, 24 and 26 three holes are drilled into the intersections of the three legs of the triangle shown in FIGURE 2 as holes 74, 76, and 78. For instance, at mirror 24 since the current will take the shortest and least resistant path it will curve from tube 12 to tube 14 closely around point 80 thus remaining physically separated from the surface of mirror 24.

The discharge in the laser gas causes two beams of laser light to be generated along a path 82 in opposite directions as shown by arrow heads 84 and 86. The two beams are reflected around the triangle by means of mirrors 20, 24, and 26. These two counter-rotating beams will be of the same frequency unless the block 10 is rotating about an axis perpendicular to the paper in FIGURE 2. If block 10 does rotate the two beams will differ in frequency and this difference is sensed in the following way. Since the dielectric mirrors are not perfect in their reflectance a small portion of the two beams will pass out through each mirror. At mirror 26 a special prism 90 is bonded to mirror 26 so as to combine these two separate beams and project them onto a detector with a slight angle between them. Since the two beams are monochromatic the slight angle causes a fringe pattern to be generated on the surface of a detector array 91. If one of the beams of light is of higher frequency than the other the alternate light and dark bands of the fringe pattern will move in one direction while if the other beam has a higher frequency the fringe pattern will move in the opposite direction. This movement may be analyzed by detector array 91 in a conventional manner well known in the art. The direction and rate of movement of this fringe pattern is indicative, then, of the rate and direction of rotation of block 10.

In the preferred embodiment surface 92 of prism 90 has approximately a 50% reflective coating on it while surface 94 has approximately a 100% reflective coating on it. Consequently, the beam of light traveling in the direction shown by arrow 86 passes through mirror 26 and into prism 90 at a point 96 where it continues on out through prism 90 to detector 91. The beam of light shown by arrow 84 passes through mirror 26 and into prism 90 to surface 94 where it is reflected to a surface 98 and, thence, back approximately to point 96 where it is also reflected out of prism 90 onto detector 91. The emergent angle between beam 84 and 86 is shown as angle $\theta$. The angle $\theta$ may be closely controlled by the angle between surface 94 and surface 98 of prism 90. The relationship is that the angle between surface 94 and surface 98 is equal to 90° plus or minus $\theta$ divided by 2. That is to say any deviation in the angle between surface 94 and surface 98 from 90° will result in an angle between beams 84 and 86 which is twice as large as that deviation. Thus, the size and position of the fringe pattern on detector 91 may be controlled by the selection of the shape of prism 90.

The advantage of a prism shaped like prism 90 are numerous. The prism 90 tends to keep reflections of one beam from returning in an opposite direction around the triangular path which would hamper the operation of the present invention. All surfaces which would reflect light do so in a direction not coaxial with any of the legs of the triangle. Furthermore, due to the near 90° angle between surfaces 94 and 98, rotation of prism 90 about an axis perpendicular to FIGURE 2 results in no change in the output angle of beams 84 and 86. Therefore, the exact alignment of the optical components during assembly is made less difficult. In fact the present invention is relatively insensitive to rotation of any of the mirrors about an axis perpendicular to FIGURE 2 relative to block 10 since a triangular configuration such as shown tends to be substantially self-aligning over a wide range of angles. That is to say, small misalignments of mirrors 20, 24, and 26 about a vertical axis cause no deterioration in the operation of the device.

In addition since mirrors 20, 24, and 26 and prism 90 are all constructed of quartz in the preferred embodiment and are all tightly bonded to the quartz block 10, the resultant device becomes a solid and rugged structure which is able to withstand high accelerations and other mechanical stresses. A minimum number of optical components is required, thus, avoiding the reduced performance of a laser beam which results from imperfections in the optical components and their surfaces.

In the preferred embodiment mirror 20 is shown to have a slightly curved surface 100. A curved surface such as this has been found to be helpful in collimating the two laser beams and preventing dispersion thereof. A possible radius of curvature of surface 100 found to work well in the preferred embodiment is 15 meters. Also, it has been found that the maintenance of the diameter of tubes 12, 14, and 16 at a relatively small value is advantageous in maintaining a high power output of the laser beams. A diameter of approximately $5/16$ of an inch has been found suitable in the preferred embodiment. Also shown in FIGURE 2 are three mounting holes numbered 101, 103, and 105. These holes may be used to fasten the laser angular rate sensor to whatever object the rotation of which is to be measured. Various modifications and variations may be made to the present invention without departing from its spirit and scope as defined in the appended claims.

I claim:

1. A laser angular rate sensor for comparing the frequency of two counter rotating beams of light as an indication of the rate of rotation of the sensor which comprises:
   a substantially thermally and mechanically stable block which has three gas containing tunnels meeting so as to form a substantially triangular cavity therein;
   three reflecting surfaces bonded to the exterior of said block in a position operable to seal said triangular cavity and reflect light along said triangular cavity;
   a gas containing reservoir cavity connected to said tunnels and enclosing an electrode;
   a pair of elcetrodes within said triangular cavity operable to support a current through the gas from the other electrode in the reservoir cavity in two directions about said triangular path thereby inducing the gas to lase along said triangular path;
   means to control the current to each of said pair of electrodes; and
   means to compare the frequency of the two laser beams as an indication of the amount of rotation of the block.

2. Apparatus as set forth in claim 1 wherein the frequency comparing means comprises a prism operable to accept two beams of light and project them onto a detector with a small angle between them.

3. In apparatus to measure rotation about an axis the combination of:
   a substantially thermally and mechanically stable block having a plurality on interconnected cavities therein, a portion of said cavities disposed so as to form a closed polygonal path wherein light may travel in opposite directions about the axis;

a plurality of mirrors affixed to the block at the intersections of the polygonal path forming cavities so as to reflect light from one cavity into the adjacent cavity;

a cathode positioned in a cavity outside of said polygonal path;

a pair of anodes positioned within the polygonal path forming cavities;

means to control the current between said cathode and anodes;

a lasing gas within said cavities operable to conduct current between said cathodes and said anodes in two directions about said polygonal path thereby generating two opposite traveling beams of substantially monochromatic light in said polygonal path; and means to compare the frequency of said two beams as an indication of rotation of said block about the axis.

4. A rotation sensor as set forth in claim 3 wherein the frequency comparing means comprises a prism bonded to one of said mirrors and operable to project the two beams of light emitted therefrom onto a detector with a small angle between them.

5. A laser angular rate sensor for comparing the frequency of two counter rotating beams of light as an indication of the rate of rotation of the sensor which comprises:

a quartz block which has three laser gas containing tunnels therethrough, the ends of said tunnels meeting so as to form a substantially triangular path within said triangular cavity;

a lasing gas containing reservoir cavity connected to said triangular cavity;

a cathode within said reservoir cavity;

a pair of anodes within said triangular cavity operable to maintain a current through the gas from the reservoir cavity cathode in two directions about said triangular path thereby inducing the gas to lase in both directions along said triangular path;

means to control the current to each of said pair of electrodes; and means to compare the frequencies of the laser light as an indication of the amount of rotation of the block.

6. In apparatus to measure rotation about an axis by comparing the frequency of two beams of light traveling in opposite directions aronud the axis the combination of:

a quartz block having a plurality of straight cylindrical inner-connected cavities therein, three of said cavities disposed so as to form a closed triangular path wherein light may travel in opposite directions about the axis;

three dielectric mirrors affixed to the quartz block at the intersection of the triangular forming cavities so as to reflect light from one cavity into the adjacent cavity;

a cathode in one of said cavities, the cathode containing cavity being connected to the center of one of the triangular cavity forming cylindrical cavities;

a pair of anodes positioned within the triangular cavity remote from the side of the triangular cavity which is connected to the cathode containing cavity;

a lasing gas within said cavities so as to sustain a discharge between said cathode and said anodes thereby generating two oppositely traveling beams of light in said triangular cavity.

7. A laser angular rate sensor for comparing the frequency of two counter rotating beams of light as an indication of the rate of rotation of the sensor which comprises:

quartz block having a triangular shaped cavity therein;

three dielectric mirrors attached to said quartz block at the corners of said triangular cavity so as to support two oppositely traveling beams of laser light on a triangular path within said triangular cavity;

a separate gas containing reservoir cavity within said quartz block connected to said triangular cavity;

a cylindrical cathode within said reservoir cavity;

two anodes within said triangular cavity operable to maintain a discharge through a gas which is contained within said cavity so as to induce the lasing action;

means to independently supply current to each of said anodes so as to regulate the current therethrough; and means to compare the frequencies of the two laser beams as an indication of the amount of rotation of the block.

8. The combination set forth in claim 7 wherein a prism is affixed to one of the said three mirrors so as to project the two beams of light passing therethrough onto a detector, said prism utilizing an internally reflecting substantially right angle surface to suppress misalignments due to rotations about an axis perpendicular to the plane of said triangular path.

References Cited

UNITED STATES PATENTS

| | | | |
|---|---|---|---|
| 3,140,451 | 7/1964 | Fox | 331—94.5 |
| 3,248,671 | 4/1966 | Dill et al. | 331—94.5 |
| 3,308,395 | 3/1967 | Sorokin | 331—94.5 |
| 3,332,314 | 7/1967 | Rosenthal | 331—94.5 |

FOREIGN PATENTS 1,384,095  11/1964  France.

OTHER REFERENCES

Laser Gyro's New Config., Electronics, June 28, 1963.
A Small Stable Gas Laser, Philips Tech. Rev., vol. 24, No. 3, Feb. 4, 1963.

JEWELL H. PEDERSEN, *Primary Examiner.*

B. LACOMIS, *Assistant Examiner.*

UNITED STATES PATENT OFFICE
CERTIFICATE OF CORRECTION

Patent No. 3,390,606                                          July 2, 1968

Theodore J. Podgorski

It is certified that error appears in the above identified patent and that said Letters Patent are hereby corrected as shown below:

Column 5, line 31, after "triangular" insert -- cavity;
    three mirrors bonded to the exterior of said block in a position operable to seal said triangular cavity and reflect light along a triangular --.

Signed and sealed this 10th day of February 1970.

(SEAL)
Attest:

Edward M. Fletcher, Jr.                        WILLIAM E. SCHUYLER, JR.
Attesting Officer                                     Commissioner of Patents